United States Patent
Chen

(10) Patent No.: US 6,224,209 B1
(45) Date of Patent: May 1, 2001

(54) EYEGLASSES FRAME ALLOWING REPLACEMENT OF LENSES

(76) Inventor: Wu Meihua Chen, 28-2, Sa Ren Road, Ching Sa Village, An Den Country, Tainan (TW)

( * ) Notice: Subject to any disclaimer, the term of this patent is extended or adjusted under 35 U.S.C. 154(b) by 0 days.

(21) Appl. No.: 09/557,754

(22) Filed: Apr. 25, 2000

(51) Int. Cl.$^7$ .................................................. G02C 1/00
(52) U.S. Cl. .................................... 351/86; 351/83
(58) Field of Search ........................ 351/83, 86, 140, 351/97

(56) References Cited

U.S. PATENT DOCUMENTS 5,373,331 * 12/1994 Vallalla et al. ..................... 351/86
5,467,148 * 11/1995 Conway ............................. 351/86
6,086,199 * 7/2000 Holland et al. .................... 351/86

* cited by examiner

Primary Examiner—Huy Mai
(74) Attorney, Agent, or Firm—Rosenberg, Klein & Lee

(57) ABSTRACT

A pair of glasses includes a frame including two eyewires. A lens is removably received in each eyewire. A rod is pivotally mounted to a periphery of each eyewire and includes an end that is movable between a first position for retaining an associated lens in an associated eyewire and a second position allowing removal of the associated lens. In an alternative embodiment of the invention, a rod is pivotally mounted between the eyewires and includes two ends. Each end of the rod being movable between a first position for retaining an associated lens in an associated eyewire and a second position allowing removal of the associated lens. At least one protrusion is provided to prevent excessive pivotal movement of the rod.

4 Claims, 3 Drawing Sheets

EYEGLASSES FRAME ALLOWING REPLACEMENT OF LENSES

BACKGROUND OF THE INVENTION

1. Field of the Invention

The present invention relates to a frame of a pair of eyeglasses that allows replacement of lenses.

2. Description of the Related Art

Eyeglasses are required for people suffering from myopia or hypermetropia. Sunglasses are popular as they may protect the eyes from being injured by strong sunlight and provide aesthetically pleasing effect. A device has been proposed to attach a pair of lenses for sunglasses to a pair of glasses to meet different end. Lenses for myopia or hypermetropia are inserted into eyewires of a frame of the glasses with each sunglasses lens attached to outer edge of the lenses for myopia or hypermetropia. A hanger rod is attached to a periphery of each sunglasses lens that is releasably attached to the main glasses by magnetic. Nevertheless, it is a burden to wear a pair of glasses with two pairs of lenses. Replacement of lenses by means of forcibly removing the lenses from the eyewires of the frame of the glasses and forcibly inserting new lenses into the eyewires of the frame are awkward and difficult.

SUMMARY OF THE INVENTION

It is a primary object of the present invention to provide a frame of a pair of eyeglasses that allows replacement of lenses.

In accordance with one aspect of the invention, a pair of glasses comprises a frame including two eyewires. A lens is removably received in each eyewire. A rod is pivotally mounted to a periphery of each eyewire and includes an end that is movable between a first position for retaining an associated lens in an associated eyewire and a second position allowing removal of the associated lens. A protrusion is formed on each eyewires for preventing excessive pivotal movement of each rod.

In accordance with another aspect of the invention, a pair of glasses comprises a frame including two eyewires. A lens is removably received in each eyewire. A rod is pivotally mounted between the eyewires and includes two ends. Each end of the rod being movable between a fist position for retaining an associated lens in an associated eyewire and a second position allowing removal of the associated lens. A protrusion is formed on one of the eyewires for preventing excessive pivotal movement of the rod.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
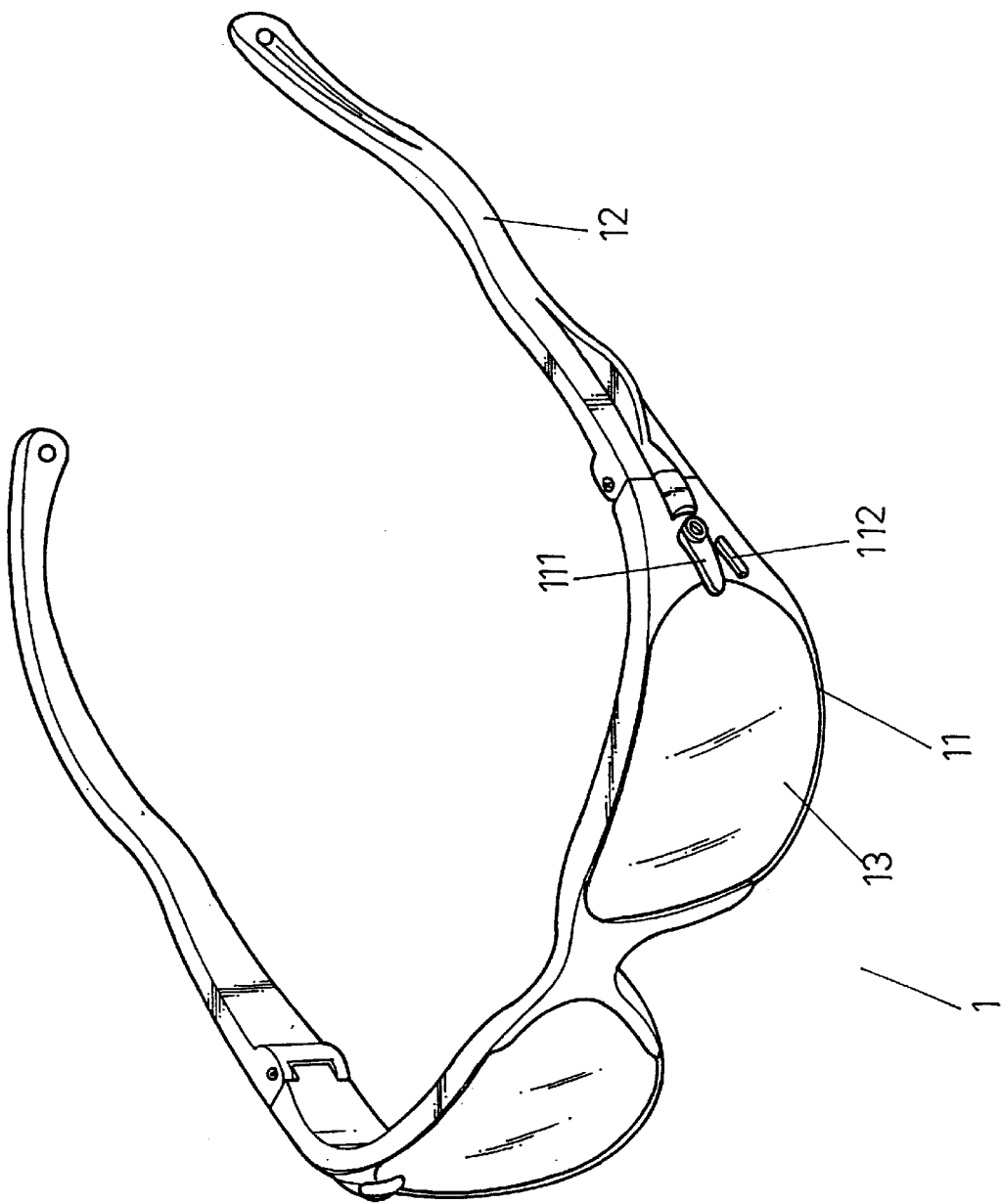
FIG. 1 is a perspective view of a pair of glasses in accordance with the present invention.
Figure 2:
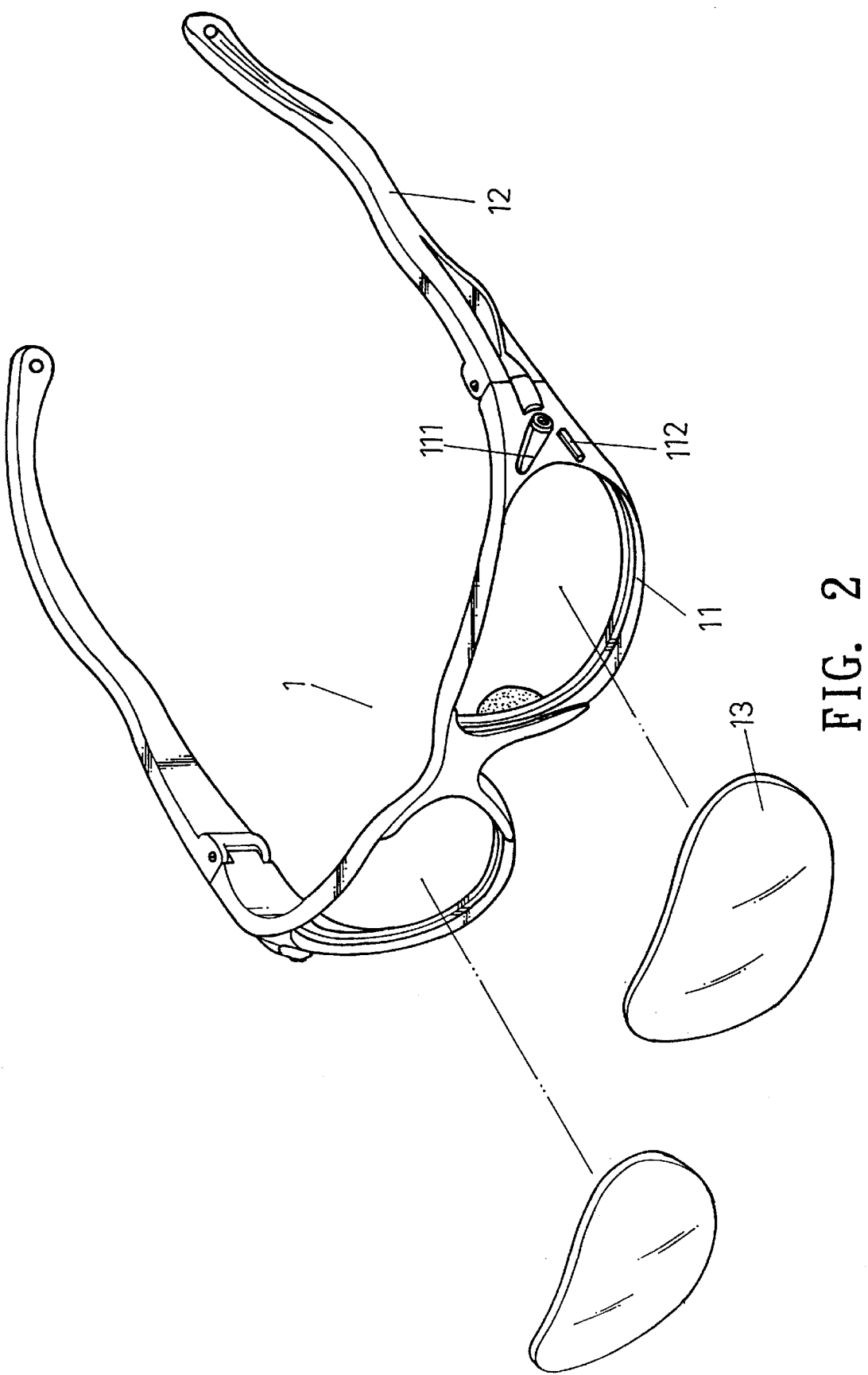
FIG. 2 is an exploded perspective view of the pair of glasses in accordance with the present invention.

Referring to FIGS. 1 and 2, a pair of glasses in accordance with the present invention generally comprises a frame including two eyewires 11 and two templates 12. In this embodiment, the eyewires 11 are integrally formed. A lens 13 is removably received in each eyewire 11. A rod 111 is pivotally mounted to a periphery of each eyewire 11 and includes an end that is movable between a first position for retaining the lens 13 in the eyewire 11 (FIG. 1) and a second position allowing removal of the lens 13 (FIG. 2). Thus, the lens 13 may be easily removed from or inserted into the eyewire 11. A protrusion 112 may be formed on the eyewire 11 adjacent to the rod 111 to prevent excessive pivotal movement of the rod 11.

Figure 3:
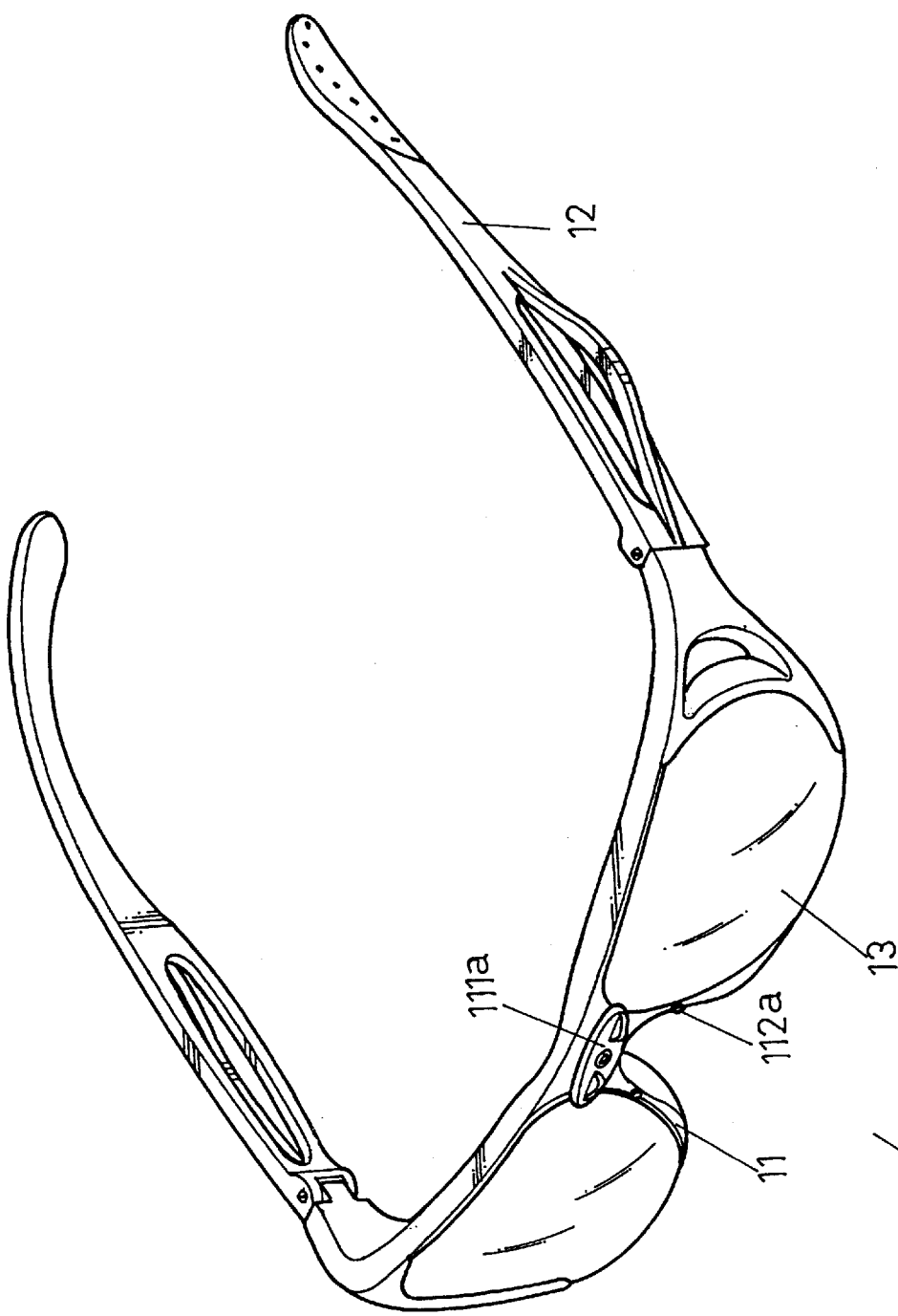
FIG. 3 is an exploded perspective view of a modified embodiment of the glasses in accordance with the present invention.

FIG. 3 illustrates a modified embodiment of the invention, wherein a rod 111a is pivotally mounted to the frame at a location between the eyewires 11. Each end of the rod 111a in FIG. 3 is in a position for retaining an associated lens 13 in an associated eyewires 11. Nevertheless, the rod 111a may be moved to a position allowing the lenses 13 to be removed from or inserted into the eyewires 11. One or two protrusions 112a may be formed on one of the eyewires 11 adjacent to the rod 111 to prevent excessive pivotal movement of the rod 11.

Thus, the rod 111, 111a allows easy removal/insertion of the lenses 13 from/into the eyewires 11 such that the user may replace the required lenses whenever needed.

Although the invention has been explained in relation to its preferred embodiment, it is to be understood that many other possible modifications and variations can be made without departing from the spirit and scope of the invention as hereinafter claimed.

What is claimed is:

1. A pair of glasses comprising a frame including two eyewires, a lens being removably received in each said eyewire, a rod being pivotally mounted to a periphery of each said eyewire and including an end that is movable between a first position for retaining an associated said lens in an associated said eyewire and a second position allowing removal of the associated lens.

2. The pair of glasses as claimed in claim 1, further comprising a protrusion formed on each said eyewires for preventing excessive pivotal movement of each said rod.

3. A pair of glasses comprising a frame including two eyewires, a lens being removably received in each said eyewire, a rod being pivotally mounted between the eyewires and including two ends, each said end of the rod being movable between a first position for retaining an associated said lens in an associated said eyewire and a second position allowing removal of the associated lens.

4. The pair of glasses as claimed in claim 3, further comprising a protrusion formed on one of the eyewires for preventing excessive pivotal movement of said rod.

* * * * *